(12) United States Patent
McVay et al.

(10) Patent No.: US 10,452,532 B2
(45) Date of Patent: Oct. 22, 2019

(54) DIRECTED SANITIZATION OF MEMORY

(71) Applicant: Micron Technology, Inc., Boise, ID (US)

(72) Inventors: Jeffrey L. McVay, El Dorado Hills, CA (US); Daniel J. Hubbard, Boise, ID (US); Robert W. Strong, Folsom, CA (US); Michael B. Danielson, Georgetown, TX (US); Jonathan Tanguy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 395 days.

(21) Appl. No.: 15/404,407

(22) Filed: Jan. 12, 2017

(65) Prior Publication Data

US 2018/0196743 A1 Jul. 12, 2018

(51) Int. Cl.
*G06F 12/00* (2006.01)
*G06F 12/02* (2006.01)
*G06F 3/06* (2006.01)

(52) U.S. Cl.
CPC ........ *G06F 12/0246* (2013.01); *G06F 3/0608* (2013.01); *G06F 3/0652* (2013.01); *G06F 3/0679* (2013.01); *G06F 3/0688* (2013.01); *G06F 2212/1032* (2013.01); *G06F 2212/152* (2013.01); *G06F 2212/214* (2013.01); *G06F 2212/7201* (2013.01); *G06F 2212/7205* (2013.01)

(58) Field of Classification Search
CPC .... G06F 12/0246; G06F 3/0619; G06F 3/064; G06F 3/0652; G06F 3/0665; G06F 3/0679; G06F 2212/1032; G06F 2212/152; G06F 2212/214; G06F 2212/7201; G06F 2212/7205; G06F 3/0608; G06F 3/0688
See application file for complete search history.

(56) References Cited

U.S. PATENT DOCUMENTS 5,819,304 A * 10/1998 Nilsen ................. G06F 12/0253
  711/5
6,173,291 B1 * 1/2001 Jenevein ............. G06F 11/1435
6,349,312 B1    2/2002 Fresko et al.
(Continued)

FOREIGN PATENT DOCUMENTS

TW   201606503 A    2/2016
TW   201619967 A    6/2016
WO   2008130799 A1  10/2008

OTHER PUBLICATIONS

International Search Report and Written Opinion from related international application No. PCT/US2018/013048, dated Apr. 26, 2018, 17 pp.

(Continued)

*Primary Examiner* — Gurtej Bansal
(74) *Attorney, Agent, or Firm* — Brooks, Cameron & Huebsch, PLLC

(57) ABSTRACT

The present disclosure includes apparatuses and methods for directed sanitization of memory. One example method comprises, responsive to receiving a sanitization command, performing a deterministic garbage collection operation on a memory, wherein performing the deterministic garbage collection operation results in physical erasure of all invalid data stored on the memory without losing valid data stored on the memory.

9 Claims, 5 Drawing Sheets

(56) References Cited

U.S. PATENT DOCUMENTS

| | | | |
|---|---|---|---|
| 6,654,773 B2 | 11/2003 | Hills | |
| 7,584,232 B2 | 9/2009 | Guo | |
| 9,304,907 B2 | 4/2016 | Yeh | |
| 2003/0229753 A1* | 12/2003 | Hwang | G06F 3/0616 |
| | | | 711/103 |
| 2010/0262766 A1* | 10/2010 | Sprinkle | G06F 12/0246 |
| | | | 711/103 |
| 2013/0246688 A1 | 9/2013 | Kanno et al. | |
| 2014/0359198 A1 | 12/2014 | Zaltsman et al. | |
| 2015/0347025 A1 | 12/2015 | Law | |
| 2017/0322727 A1* | 11/2017 | Yeh | G06F 3/061 |

OTHER PUBLICATIONS

Tallis "Samsung Announces 960 PRO and 960 EVO M.2 PCle SSDS (Updated)", AnandTech, <http://www.anandtech.com/show/10698/samsung-announces-960-pro-and-960-evo-m2-pcie-ssds>, Sep. 21, 2016, 6 pp.

Office Action from related Taiwanese patent application No. 107101143, dated Jan. 30, 2019, 19 pp.

\* cited by examiner

DIRECTED SANITIZATION OF MEMORY

TECHNICAL FIELD

The present disclosure relates generally to semiconductor memory apparatuses and methods, and more particularly, to directed sanitization of memory.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electromechanical delays associated with magnetic disk drives.

In various instances, it can be beneficial and/or desirable to erase data stored in memory (e.g., to delete files or portions thereof that may contain sensitive and/or private information). Some deletion mechanisms may not involve actual physical erasure of the data such that it is possible for the data to be recovered from the memory. For instance, a deletion mechanism might involve physical erasure of memory locations currently storing a particular file, but memory locations which may have previously stored the particular file, or portions thereof, may not be physically erased. Other deletion mechanisms might involve physical erasure of all data stored in memory, which ensures deletion of data targeted for deletion, but also erases data that may not be targeted for deletion.

DETAILED DESCRIPTION

Figure 1:
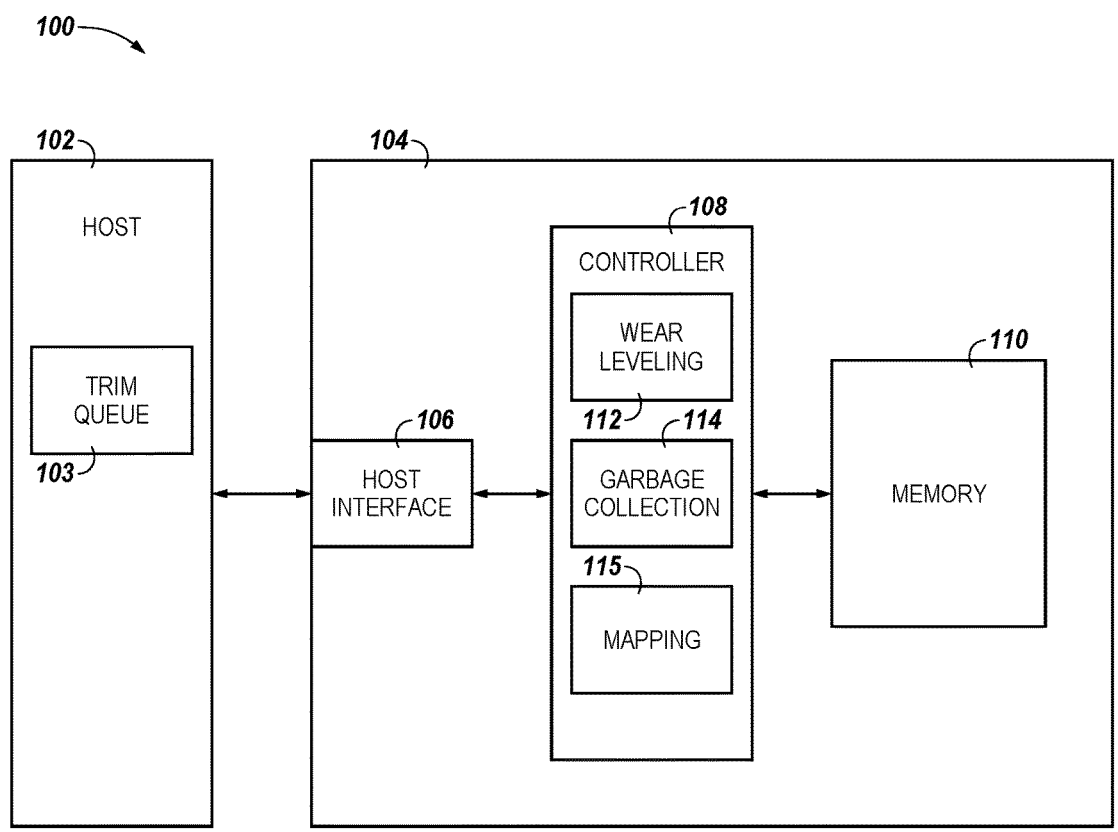
FIG. 1 is a block diagram of an apparatus in the form of a computing system including a memory system comprising a controller configured to perform directed sanitization in accordance with a number of embodiments of the present disclosure.

The present disclosure includes apparatuses and methods for directed sanitization associated with memory. One example method comprises, responsive to receiving a sanitization command, performing a deterministic garbage collection operation on a memory, wherein performing the deterministic garbage collection operation results in physical erasure of all invalid data stored on the memory without losing valid data stored on the memory.

Embodiments of the present disclosure can provide various benefits such as providing for secure erasure (e.g., of data targeted by the host for deletion) in a deterministic manner. For instance, a number of embodiments of the present disclosure provide a mechanism for host-initiated secure erasure of data corresponding to specific logical block addresses (LBAs) as well as previous copies of the data that might reside in memory. A number of embodiments can implement secure erasure using a deterministic garbage collection operation, as opposed to a typical garbage collection operation that might be associated with wear leveling operations performed in the background. Such background garbage collection is often non-deterministic in that it is often not initiated by a host and is not performed on demand but rather at some non-deterministic time in the future (e.g., as directed by a controller, such as an SSD controller, in association with wear leveling).

A number of embodiments provide directed sanitization that ensures that all copies (e.g., current and past) of data corresponding to a particular file, for example, are physically erased from memory, as opposed to being only logically erased (e.g., marked as invalid while still being physically stored in memory). The directed sanitization (e.g., secure erasure) can be performed using a deterministic garbage collection operation, which can provide a guaranty that no valid data (e.g., "live" data being tracked by a host) is erased.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N," "B," "R," and "S", particularly with respect to reference numerals in the drawings, indicate that a number of the particular feature so designated can be included. As used herein, "a number of" a particular thing can refer to one or more of such things (e.g., a number of blocks can refer to one or more blocks).

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus in the form of a computing system 100 including a memory system 104 comprising a controller 108 configured to perform directed sanitization in accordance with a number of embodiments of the present disclosure. As used herein, a memory system 104, a controller 108, or a memory 110 might also be separately considered an "apparatus." The memory system 104 can be a solid state drive (SSD), for instance, and can include a host interface 106, a controller 108 (e.g., a sequencer and/or other control circuitry), and a memory 110. Although not shown in FIG. 1, the memory 110 can comprise, for instance, a number of solid state memory devices, such as NAND flash devices, which provide a storage volume for the memory system 104.

The controller 108 can be coupled to the host interface 106 and to the memory 110 via a plurality of channels and can be used to transfer data between the memory 110 and a host 102. The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106.

A host 102 can be a host system such as a personal laptop computer, a desktop computer, a digital camera, a mobile telephone, or a memory card reader, among various other types of hosts. The host 102 can include a system motherboard and/or backplane and can include a number of memory access devices (e.g., a number of processors). The host 102 can also be a controller, such as where the memory system 104 is a memory device having an on-die controller. The host 102 can be configured to provide various commands to the memory system 104 (e.g., to the controller 108) to direct the memory system 104 to perform various operations in accordance with the received command. For example, the host 102 can be configured to provide a sanitization command to the controller 108 such that the controller 108 initiates a deterministic garbage collection operation responsive to receiving the sanitization command, as further described herein. In a number of embodiments, the sanitization command can be sent as an interrupt signal such that, for instance, the controller 108 performs the deterministic garbage collection operation "on demand" upon receiving the command. For example, upon receiving the sanitization command, the controller 108 can suspend its current activities, save its state, and perform the deterministic garbage collection operation.

The host 102 can include a trimming queue 103 (TRIM QUEUE), which can be used in association with an operating system (OS) trimming feature. The trimming queue 103 can be configured to store logical block addresses (LBAs) corresponding to data no longer in use and/or being tracked by host 102, for example, such that the data may be marked as invalid and erased from memory 110. The LBAs in the trimming queue 103 can be sent to the controller 108 in association with a trimming command. As used herein, a trimming command can be a TRIM command, UNMAP command, or DEALLOCATE command, among other commands, which can depend on a particular interface type and/or protocol (e.g., ATA, SCSI, etc.). As described further herein, in a number of embodiments, the host 102 can initiate a forced flush of the trimming queue in association with providing a host-initiated sanitization command to the controller 108, which can initiate a deterministic garbage collection operation that results in secure erasure of at least the data corresponding to the LBA list provided from the trimming queue 103.

The controller 108 can control performance of various operations (read, write, erase, etc.) on the memory 110, which can comprise a number of memory dies (e.g., NAND dies), for example. The controller 108 can be on a same die or a different die than memory 110. Although not specifically illustrated, the controller 108 can include a discrete memory channel controller for each channel coupling the controller 108 to the memory 110. The controller 108 can include, for example, a number of components in the form of hardware and/or firmware (e.g., one or more integrated circuits) and/or software for controlling access to the memory 110 and/or for facilitating data transfer between the host 102 and memory 110.

As illustrated in FIG. 1, the controller 108 can include a wear-leveling component 112, a garbage collection component 114, and a mapping component 115. The wear-leveling component 112 can include, for example, circuitry configured to reduce the number of process cycles (e.g., program and/or erase cycles) performed on a particular group of cells (e.g., block) by spreading the cycles more evenly over an entire array and/or device. The wear leveling component 112 can be configured to perform dynamic wear leveling, which can include garbage collection performed via garbage collection component 114. Garbage collection can include reclaiming (e.g., erasing and making available for programming) blocks that have the most invalid pages (e.g., according to a "greedy algorithm"). Alternatively, garbage collection can include reclaiming blocks with more than a threshold amount (e.g., quantity) of invalid pages. If sufficient free blocks exist for a programming operation, then a garbage collection operation may not occur. An invalid page, for example, can refer to a page whose corresponding logical to physical address mapping has been updated (e.g., such that the data corresponding to the previous mapping is stale). Component 112 can also perform static wear leveling, which can include writing static data to blocks that have high program/erase counts to prolong the life of the block.

In a number of embodiments, in the absence of a sanitization command from host 102, the garbage collection component 114 can be configured to perform garbage collection on memory 110 as a background operation. For example, performing garbage collection during idle time (e.g., when controller 108 is not executing host commands), can prevent such operations from negatively effecting latency. As described further herein, in a number of embodiments, the component 114 is configured to, responsive to a sanitization command, perform a deterministic garbage collection operation. For instance, responsive to controller 108 receiving the sanitization command, the component 114 can identify those blocks containing invalid data (e.g., invalid pages), relocate valid data (e.g., valid pages) contained in those blocks to different blocks, and physically erase the identified blocks to result in physical erasure of invalid data without losing the valid data stored on the memory 110. In a number of embodiments, performing a deterministic garbage collection operation includes performing a complete garbage collection operation, which can refer to a garbage collection operation that is executed until no blocks of the memory (e.g., 110) contain both valid pages and invalid pages (e.g., all the physical blocks have either been physically erased or contain only valid data).

The mapping component 115 can include a logical to physical address map (e.g., table) as well as indicators regarding page status (e.g., valid, invalid, erased, etc.). The address map and/or page status can be updated in various manners. For example, the mapping can be updated by controller 108 as valid data is relocated as part of garbage collection and/or wear leveling. Additionally, the address mapping and/or page status can be updated based on trimming commands from host 102 (e.g., responsive to a flushing of trimming queue 103).

The components 112, 114, 115 can be discrete components such as an application specific integrated circuit (ASIC), or the components may reflect functionally provided by circuitry within the controller 108 that does not necessarily have a discrete physical form separate from other portions of the controller 108. Although illustrated as components within the controller 108 in FIG. 1, the components 112, 114, and 115 can be external to the controller 108 or can have a number of components located within the controller 108 and a number of components located external to the controller 108. Additionally, components 112, 114, and 115 are not limited to circuitry (e.g., hardware) implementations (e.g., the can be implemented in hardware, firmware, and/or software).

In operation, data can be written to and/or read from memory 110 as a page of data, for example. As such, a page of data can be referred to as a data transfer size of the memory system. Data can be sent to/from a host (e.g., host 102) in data segments referred to as sectors (e.g., host sectors). As such, a sector of data can be referred to as a data transfer size of the host.

Figure 2:
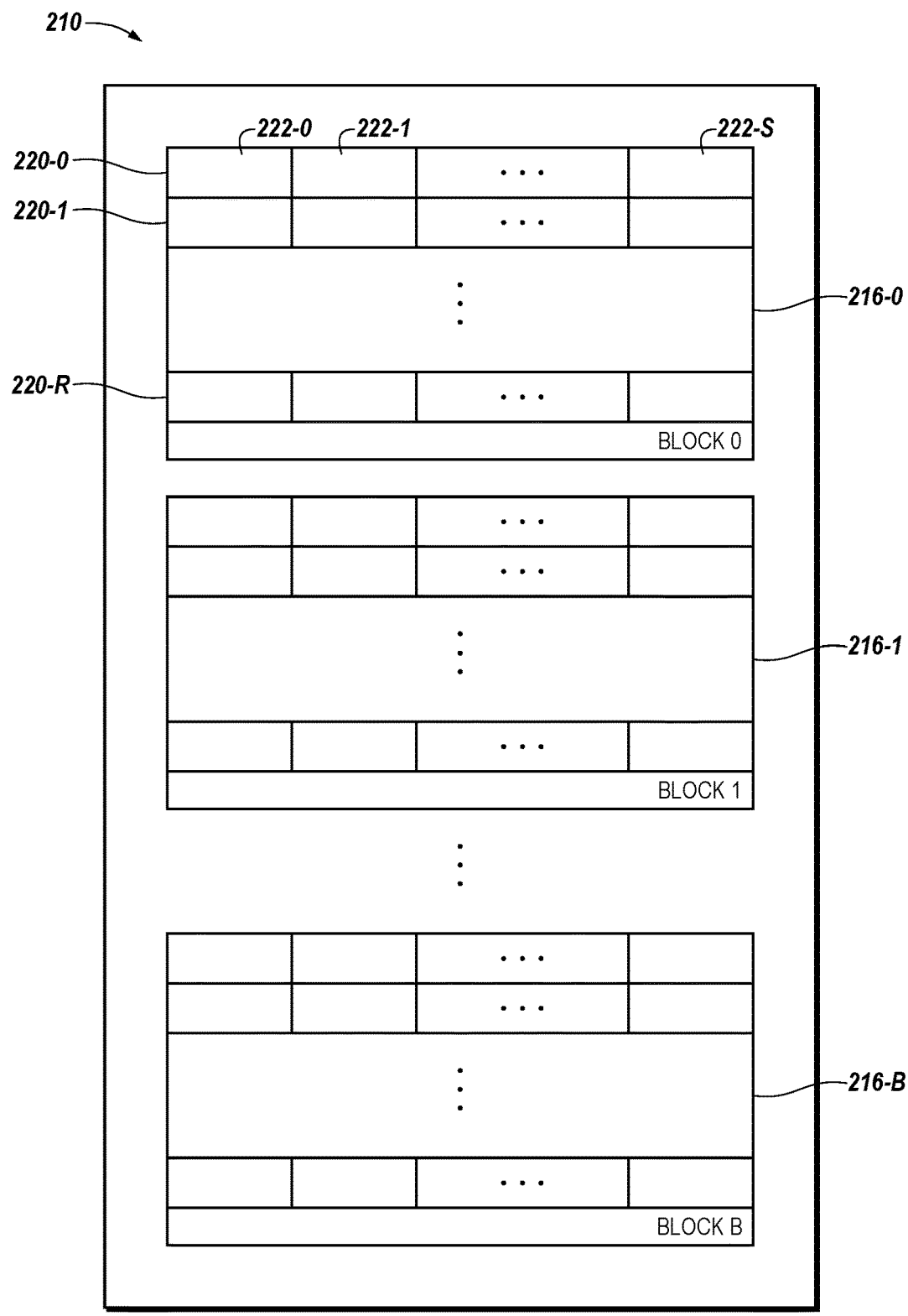
FIG. 2 illustrates a diagram of a portion of a memory having a number of physical blocks in accordance with a number of embodiments of the present disclosure.

FIG. 2 illustrates a diagram of a portion of a memory 210 having a number of physical blocks 216-0 (BLOCK 0), 216-1 (BLOCK 1), . . . , 216-B (BLOCK B) in accordance with a number of embodiments of the present disclosure. Memory 210 can be, for example, a NAND flash memory. However, embodiments of the present disclosure are not limited to a particular type of memory or memory. For example, memory 210 can be a DRAM array, an RRAM array, or a PCRAM array, among other types of memory. Further, although not shown in FIG. 2, memory 210 can be located on a particular semiconductor die along with various peripheral circuitry associated with the operation thereof.

The blocks 216-0 (BLOCK 0), 216-1 (BLOCK 1), . . . , 216-B (BLOCK B) can be referred to collectively as blocks 216. The blocks 216 can comprise single level cells (SLCs) and/or multilevel cells (MLCs). As an example, the number of physical blocks 216 in memory 210 may be 128 blocks, 512 blocks, or 1,024 blocks, but embodiments are not limited to a particular number of physical blocks in memory 210.

Each block 216 can include memory cells that are erased together as a unit. As shown in FIG. 2, each physical block 216 can comprise a number of physical rows 220-0, 220-1, . . . , 220-R of memory cells that can each be coupled to a respective access line (e.g., word line). The number of rows in each physical block can be 32, but embodiments are not limited to a particular number of rows 220 per physical block.

As one of ordinary skill in the art will appreciate, each row 220 can comprise a number of physical pages of cells. A physical page of cells can refer to a number of memory cells that are programmed and/or read together or as a functional group. In the embodiment shown in FIG. 2, each row 220 can comprise one physical page of cells. However, embodiments of the present disclosure are not so limited. For instance, each row 220 can comprise multiple physical pages of cells (e.g., an even page associated with cells coupled to even-numbered bit lines, and an odd page associated with cells coupled to odd numbered bit lines). Additionally, for embodiments including multilevel cells, a physical page can store multiple logical pages of data with each cell in a physical page contributing a bit toward a logical lower page, a bit toward a logical upper page, and one or more bits toward a respective number of logical intermediate pages.

In the example shown in FIG. 2, a physical page corresponding to a row 220 can store a number of sectors 222-1, 222-2, . . . , 222-S of data (e.g., an amount of data corresponding to a host sector, such as 512 bytes). The sectors 222 may comprise user data as well as overhead data, such as error correction code (ECC) data and LBA data. It is noted that other configurations for the physical blocks 216, rows 220, and sectors 222 are possible. For example, rows 220 can each store data corresponding to a single sector which can include, for example, more or less than 512 bytes of data.

Figure 3A:
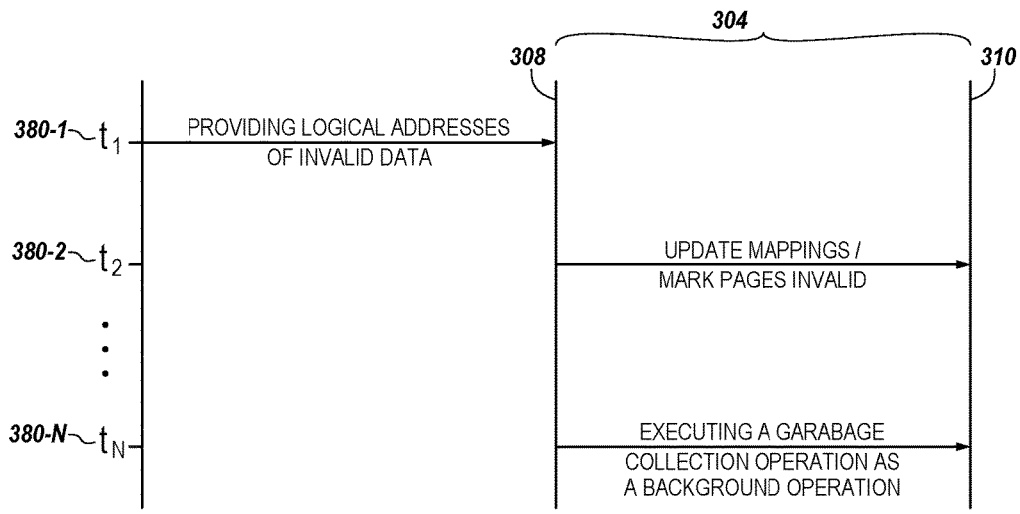
FIG. 3A illustrates a timing diagram associated with performing a garbage collection operation.

FIG. 3A illustrates a timing diagram associated with performing a garbage collection operation. The garbage collection operation described in FIG. 3A can be a non-deterministic garbage collection operation that can be performed (e.g., as a background operation) by a controller 308, which can be a controller such as controller 108 described in FIG. 1. In this example, at a time $t_1$, a host 302 provides a number of logical addresses corresponding to invalid data to controller 308. As an example, arrow 380-1 can represent a trimming command.

At time $t_2$, the controller 308 can update its page mapping responsive to the logical addresses received from the host 302 to reflect those logical pages no longer corresponding to valid data (e.g., those logical pages to be marked as invalid) and mark those pages as such (e.g., as indicated by arrow 380-2). Accordingly, the updated mappings and page status can be accounted for (e.g., by controller 308) when garbage collection occurs. However, since the garbage collection is performed as a background operation, it is performed at some non-deterministic time $t_N$ in the future (e.g., as indicated by arrow 380-N). As such, the data corresponding to the logical addresses received from host 102, which may be sensitive data targeted for erasure, is not be physically removed from memory 310 until some later time when the block(s) in which the invalid data resides is erased. Additionally, due to the nature of logical block addressing, other copies of data targeted for deletion (e.g., previous copies) may exist on memory 310 even after the data corresponding to the current mapping is physically erased.

Figure 3B:
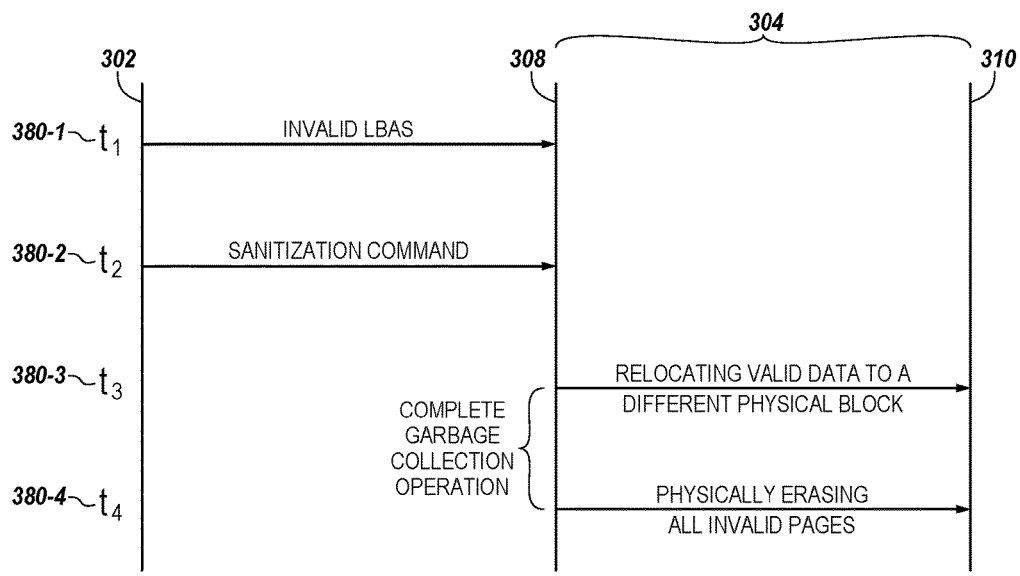
FIG. 3B illustrates a timing diagram associated with directed sanitization of memory in accordance with a number of embodiments of the present disclosure.

FIG. 3B illustrates a timing diagram associated with directed sanitization of a memory 310 in accordance with a number of embodiments of the present disclosure. In this example, at a time $t_1$, a host 302 provides a number of logical addresses (e.g., LBAs) corresponding to invalid data to controller 308. As an example, arrow 380-1 can represent a trimming command sent in association with a forced flush of a trimming queue initiated by the host 302. At time $t_2$, a host-initiated sanitization command 380-2 is sent to controller 308. Although shown as occurring at separate times in FIG. 3B, the forced flush of the trimming queue may be provided in parallel with the sanitization command in association with a directed sanitization operation.

Responsive to the sanitization command 380-2, the controller 308 can initiate a deterministic garbage collection operation. The deterministic garbage collection operation can be a complete garbage collection operation as opposed to a partial garbage collection operation. A partial garbage collection operation can refer to a garbage collection operation in which some blocks containing invalid pages are erased (e.g., subsequent to relocating any valid pages in the blocks). A complete garbage collection operation can refer to a garbage collection operation that results in no physical block containing invalid pages (e.g., all physical blocks previously containing invalid data have been physically erased and any valid pages previously stored in blocks containing both valid pages and invalid pages have been relocated to different physical blocks), such that all blocks of the memory 310 either contain only valid pages or a combination of valid pages and physically erased cells.

In the example shown in FIG. 3B, arrow 380-3 represents relocation of all valid pages contained in a block storing both valid and invalid pages to a different (e.g., free) block, and arrow 380-4 represents physical erasure of all blocks containing invalid pages. The garbage collection performed in response to the sanitization command 380-2 is deterministic in that it can be performed on demand (e.g., by host 302) and can guarantee that all data corresponding to the invalidated LBAs from host 302 is physically erased from memory 310 between time $t_3$ and $t_4$, without losing valid data stored in memory 310. Also, unlike the garbage collection operation described in FIG. 3A, which is performed in the background in a non-deterministic manner by controller 308, execution of the deterministic garbage collection operation shown in FIG. 3B occurs responsive to the sanitization command 380-2.

Additionally, although not shown in FIG. 3B, the controller 308 can be configured to report a completion status of the deterministic garbage collection operation to host 302. As an example, the completion status may simply indicate a pass/fail of the garbage collection operation. However, the completion status may also, or instead, indicate a completion amount (e.g., percentage) associated with the deterministic garbage collection operation. The host 302 may poll the memory system (e.g., via controller 308) for the completion status, and/or the controller 308 may send the completion status unsolicited.

Figure 4A:
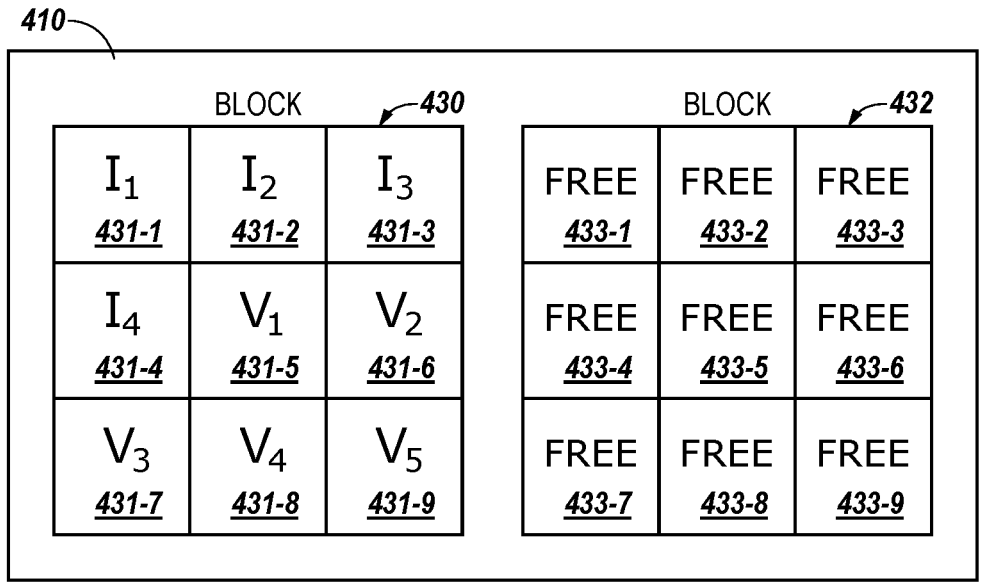
FIG. 4A illustrates block status of a memory prior to directed sanitization in accordance with a number of embodiments of the present disclosure.
Figure 4B:
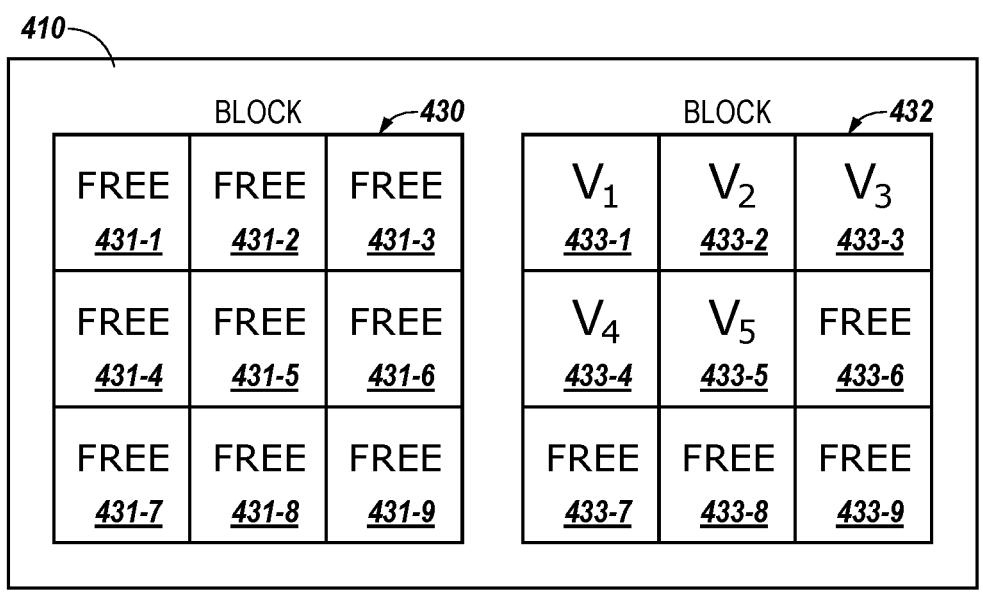
FIG. 4B illustrates block status of the memory shown in FIG. 4A subsequent to the directed sanitization in accordance with a number of embodiments of the present disclosure.

FIG. 4A illustrates block status of a memory 410 prior to directed sanitization, and FIG. 4B illustrates block status of the memory 410 shown in FIG. 4A subsequent to directed sanitization in accordance with a number of embodiments of the present disclosure. In FIGS. 4A and 4B, the memory 410 is shown as including two physical blocks 430 and 432 for purposes of illustrating the example; however, embodiments are not limited to a particular number of blocks. Although embodiments described in FIG. 4 involve deterministic executions of garbage collection operations on blocks of NAND memory cells, embodiments are not so limited.

In FIGS. 4A and 4B, the designator "V" (e.g., $V_1$ to $V_5$) represents valid data (e.g., a valid page), and the designator "I" (e.g., $I_1$ to $I_4$) represents invalid data (e.g., an invalid page) stored in a corresponding block. The designator "FREE" shown in FIGS. 4A and 4B represents a physically erased page.

In this example, each block 430 and 432 of memory 410 comprises nine pages; however, one of ordinary skill in the art will appreciate that a block can comprise more or fewer than nine pages. As shown in FIG. 4A, prior to execution of a deterministic garbage collection, block 430 contains both valid and invalid data. For instance, pages 431-1 ($I_1$), 431-2 ($I_2$), 431-3 ($I_3$), and 431-4 ($I_4$) are invalid pages, and pages 431-5 ($V_1$), 431-6 ($V_2$), 431-7 ($V_3$), 431-8 ($V_4$), and 431-9 ($V_5$) are valid pages of the block 430. In FIG. 4A, block 432 represents a physically erased block (e.g., a block containing only unprogrammed free pages). Accordingly, all pages 433-1 to 433-9 of block 432 are designated "FREE" as shown in FIG. 4A.

As shown in FIG. 4B, upon a successful completion of the deterministic garbage collection operation, none of the blocks 430 and 432 of memory 410 contain both valid and invalid pages. The garbage collection operation involves physically erasing all blocks containing invalid pages, and for those blocks containing both valid and invalid pages, relocating the valid pages to a different (e.g., free) physical block prior to erasing the block from which the valid pages were relocated. For instance, in this example, subsequent to the garbage collection operation, block 430 is in a physically erased state (e.g., all pages 431-1 to 431-9 have been physically erased such that their status is "FREE"). Also, the valid pages of block 430 (e.g., pages 431-5 to 431-9) have been relocated to physical pages (e.g., pages 433-1 to 433-5) of block 432, such that no valid pages were lost as a result of the deterministic garbage collection operation.

Figure 5:
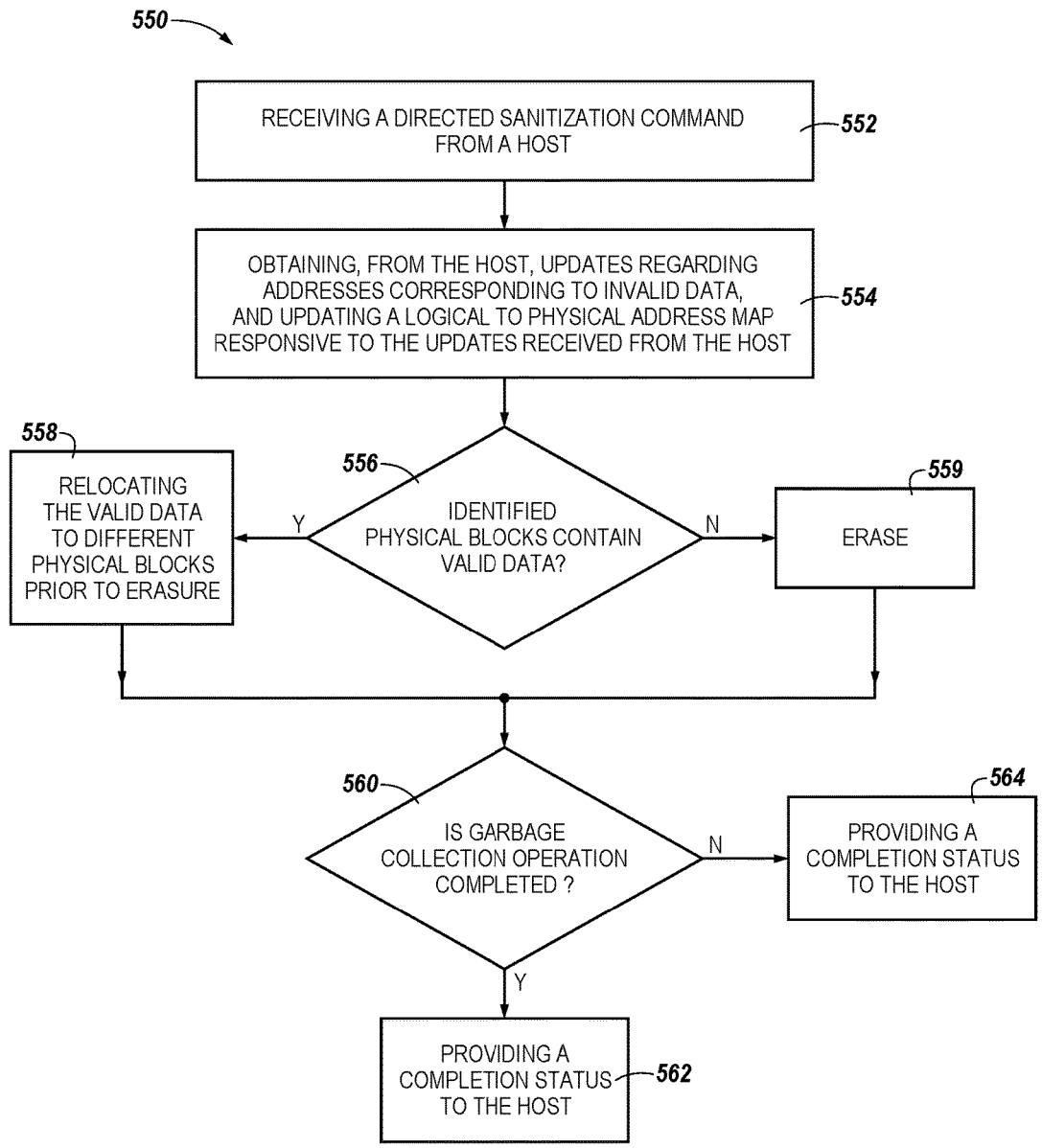
FIG. 5 illustrates a flow diagram associated with directed sanitization of memory in accordance with a number of embodiments of the present disclosure.

FIG. 5 is a flow diagram illustrating a method 550 for directed sanitization of memory in accordance with a number of embodiments of the present disclosure. At step 552, the method 550 includes receiving a directed sanitization command from a host (e.g., host 102). At step 554, the method 550 includes obtaining, from the host, updates regarding addresses (e.g., LBAs) corresponding to invalid data, and updating a logical to physical address map responsive to the updates received from the host. The address updates can be provided as command parameters of the directed sanitization command, for example. At step 554, the method 550 can also include identifying, from the updating of the logical to physical address map, physical addresses (e.g., physical pages) corresponding to logical addresses received from the host. As an example, the invalid LBAs received from the host can correspond to a file targeted for deletion, which may comprise sensitive information.

At step 556, the method 550 includes determining whether blocks containing invalid pages targeted for erasure also contain valid data. If it is determined that any of the identified physical blocks contain valid data, the valid pages are relocated to different (e.g., free) physical blocks prior to physical erasure of the identified blocks, as shown at 558. If it is determined that the identified physical blocks do not contain valid data, the identified blocks are physically erased, as shown at 559.

At step 560, a determination is made regarding whether the garbage collection operation is completed (e.g., successful) or not (e.g., failed). At step 562, a completion status (e.g., PASS) is provided to the host responsive to successful completion of the deterministic garbage collection operation. At step 564, a completion status (e.g., FAIL) is provided to the host responsive to unsuccessful completion of the deterministic garbage collection operation.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for directed sanitization of memory, comprising:
   a memory; and
   a controller coupled to the memory and configured to perform a deterministic garbage collection operation on the memory responsive to receiving a sanitization command;
   wherein, performing the deterministic garbage collection operation results in physical erasure of all invalid data stored on the memory without losing valid data stored on the memory; and
   wherein the apparatus includes a host configured to:
      provide the sanitization command to the controller;
      prior to providing the sanitization command to the controller, identify logical block addresses (LBAs) associated with a file targeted for deletion; and
      provide the LBAs associated with the file targeted for deletion to the controller;
   wherein the controller is configured to, prior to performing the deterministic garbage collection operation, update a logical to physical address mapping based on the LBAs associated with the file targeted for deletion such that data corresponding to the LBAs associated with the file targeted for deletion is included in the physical erasure of all invalid data stored on the memory.

2. The apparatus of claim 1, wherein the LBAs associated with the file targeted for deletion reside in a trimming queue of the host, and wherein the host is configured to provide the LBAs associated with the file targeted for deletion to the controller in association with a forced flush of the trimming queue.

3. An apparatus for directed sanitization of memory, comprising:
   a memory; and
   a controller coupled to the memory and configured to initiate a deterministic garbage collection operation responsive to receiving a sanitization command from a host, wherein the deterministic garbage collection operation comprises:
      identifying currently invalid logical block addresses (LBAs);
      identifying physical blocks to which the currently invalid LBAs map, the identified physical blocks containing at least some invalid data;
      physically erasing the identified physical blocks; and
      for those identified physical blocks containing at least some valid data, relocating the at least some valid data to a different physical block prior to physical erasure such that, subsequent to a completion of the deterministic garbage collection operation, the memory no longer includes physical blocks containing both valid data and invalid data;
   wherein a forced flush of a trimming queue of the host is initiated in association with the sanitization command such that a LBA to physical block address table used by the controller is updated prior to initiation of the deterministic garbage collection operation.

4. The apparatus of claim 3, wherein the memory comprises a number of NAND Flash memory devices in which a physical block is a unit of erasure and is configured to store a plurality of pages of data.

5. The apparatus of claim 3, wherein, in the absence of the sanitization command, the controller is configured to perform garbage collection on the memory non-deterministically as a background operation.

6. The apparatus of claim 3, wherein the controller is configured to provide a completion status of the sanitization command to the host.

7. The apparatus of claim 6, wherein the completion status indicates a degree of a completion of the sanitization command.

8. The apparatus of claim 6, wherein the host is configured to poll the controller to obtain the completion status.

9. A method for directed sanitization of memory, comprising:
   initiating, by a controller, a deterministic garbage collection operation on a memory responsive to receiving a sanitization command from a host; and
   receiving, in association with the sanitization command, invalid LBAs form a trimming queue of the host;
   wherein performing the deterministic garbage collection operation comprises:
      identifying currently invalid logical block addresses (LBAs);
      identifying physical blocks to which the currently invalid LBAs map, the identified physical blocks containing at least some invalid data;
      physically erasing the identified physical blocks; and
      for those identified physical blocks that contain at least some valid data, relocating the at least some valid data to a different physical block prior to physical erasure such that, subsequent to a completion of the deterministic garbage collection operation, the memory no longer includes physical blocks containing both valid data and invalid data.

* * * * *